(12) United States Patent
Tomlinson et al.

(10) Patent No.: US 8,558,155 B2
(45) Date of Patent: Oct. 15, 2013

(54) DEVICE FOR DRIVING A LIGHT RECEIVING ELEMENT TO TRACK A LIGHT SOURCE

(75) Inventors: Andy Tomlinson, Royston (GB); John-Paul Szczepanik, Royston (GB)

(73) Assignee: The Technology Partnership PLC, Royton, Hertfordshire (GB)

( * ) Notice: Subject to any disclaimer, the term of this patent is extended or adjusted under 35 U.S.C. 154(b) by 416 days.

(21) Appl. No.: 12/742,628

(22) PCT Filed: Dec. 10, 2008

(86) PCT No.: PCT/GB2008/004057
§ 371 (c)(1),
(2), (4) Date: Aug. 20, 2010

(87) PCT Pub. No.: WO2009/063231
PCT Pub. Date: May 22, 2009

(65) Prior Publication Data
US 2010/0308206 A1  Dec. 9, 2010

(30) Foreign Application Priority Data
Nov. 15, 2007 (EP) .................................... 07120791

(51) Int. Cl.
*G01C 21/02* (2006.01)
*H01J 3/14* (2006.01)

(52) U.S. Cl.
USPC ......................................... 250/203.4; 250/234

(58) Field of Classification Search
USPC ......................................... 250/203.4, 234, 235
See application file for complete search history.

(56) References Cited

U.S. PATENT DOCUMENTS

| 4,968,355 A | 11/1990 | Johnson | |
| 2005/0145053 A1* | 7/2005 | Bai et al. | 74/469 |
| 2007/0132340 A1* | 6/2007 | Takeuchi et al. | 310/323.01 |

OTHER PUBLICATIONS

International Search Report for International Application No. PCT/GB2008/004057; International Filing Date: Dec. 10, 2008; Applicant: Tomlinson, Andy et al.

* cited by examiner

*Primary Examiner* — Thanh Luu
(74) *Attorney, Agent, or Firm* — Hovey Williams LLP

(57) ABSTRACT

A light tracking device comprising first and second support members and at least one light receiving element supported on each support member by one or more resilient flexible beams which deform upon relative translational displacement of the first and second support members. The first and second support members are arranged such that relative translational displacement of the members generates rotational displacement of the element. One or more resilient flexible beams may comprise spiral arms extending from the first to the second support members.

10 Claims, 6 Drawing Sheets a) standard lens arrangement  b) fresnel lens arrangement  c) parabolic reflector  d) compound parabolic concentrator

DEVICE FOR DRIVING A LIGHT RECEIVING ELEMENT TO TRACK A LIGHT SOURCE

This application claims priority to PCT International Application No. PCT/GB/2008/004057, filed Dec. 10, 2008, which claims priority to European Patent Application No. 07120791.4, filed Nov. 15, 2007. Each of these priority applications is expressly incorporated by reference herein in its entirety.

The present invention relates to a light tracking device for driving one or more light receiving elements to track a light source. Particularly the invention has application in the field of solar concentrators, where the tracking device can be used to drive one or more solar-light-to-energy converting devices to track the path of the sun.

Solar power is an extremely abundant source energy. Photovoltaics are used to convert the sunlight into electrical energy. Solar photovoltaic systems do not produce $CO_2$ emissions in use and hence are a potentially interesting source of power in the future.

However, photovoltaics are expensive to produce and therefore as an investment, it can take more than 10 years for a photovoltaic installation to repay its capital costs, and hence such systems have not historically been an attractive source of power.

To address this issue, it has been considered to use solar concentrating systems. A solar concentrating system collects direct sunlight and focuses or concentrates it into a smaller area. Expensive photovoltaic (PV) material is only placed at the point where the light is concentrated, and hence the amount of photovoltaic material used in a system of given dimensions is greatly reduced. Types of photovoltaic cell that operate well under high concentration ratios are suitable for this application. These include efficient "multiple junction" cells made by companies such as Spectrolab Inc. in the USA, that operate under several hundred times concentration ratio, or several hundred "suns".

To concentrate sunlight, the optical system needs to track the sun as it moves across the sky. Known mechanical systems for solar tracking are typically variations on two basic mechanisms that both provide 2 axes of rotation. Both are based on a gimbal type arrangement.

The first consists of a post (typically vertical) that can rotate about its own axis, and a device mounted onto the post that tilts about a horizontal axis. The combination of the tilt and rotation of the device allows it to track the seasonal and daily movement of the sun. A schematic diagram of this type of system is shown in FIG. 1 and an example of this type of device can be found in the U.S. Pat. No. 5,730,117.

The second type of device consists of two axes that could be both horizontal in the initial position. The components are mounted as shown in FIG. 2. An example of such a system is described in the U.S. Pat. No. 4,968,355. In U.S. Pat. No. 4,968,355 the general principle of the angular motion is configured in an array format to enable larger scale installations at lower cost.

However, mechanical tracking systems have typically added significant cost to the final devices. Also, there are concerns about maintenance and the long term reliability of jointed mechanical systems in dusty environments. Furthermore, due to the large angle range over which the sun moves, the motion of such systems typically means that they occupy a large volume. A system that is low profile, i.e. is thin in one dimension both in use and in transport, has advantages. For example low profile systems have lower transportation costs as completed units. They are suitable for roof-top mounting because when they are installed they do not increase the cross section presented to the wind, and hence do not increase the likely wind loads imposed on the structure of the building, and have good aesthetic qualities.

The present invention provides a new method for making a solar concentrator that is intended to address these issues.

In order to solve the problems associated with the prior art, the present invention provides, a light tracking device which comprises:

first and second support members; and at least one light receiving element supported on each support member by one or more resilient flexible beams which elastically deform upon relative translational displacement of the first and second support members, wherein the first and second support members and the resilient flexible beams are arranged such that relative translational displacement of the support members elastically deforms the resilient flexible beams and generates rotational displacement of the elements.

The light tracking device may comprise plural light receiving elements.

The one or more resilient flexible beams may comprise spiral arms extending from the element to the first and second support members.

One or each support member may be provided with an actuator to generate the relative translational displacement.

The at least one light receiving element may be a solar concentrating element which concentrates the light.

The light tracking device may further comprise:

at least one photovoltaic cell for each light receiving element positioned at the point where the light is concentrated.

The photovoltaic cell is a multiple junction photovoltaic cell.

The one or more resilient flexible beams may be made of an electrically conductive material and the resilient flexible beams may be used to conduct electrical current away from the photovoltaic cell.

The light receiving element may be one of a standard lens arrangement, a Fresnel lens, a parabolic reflector or a Compound Parabolic Concentrator (CPC).

The distance between the support members may be controlled by at least one passive structural element.

The at least one passive structural elements may comprise a wire connecting the first and second support members.

The resilient flexible beams, the at least one light receiving element and/or the first and second support members may be arranged to act as a heatsinks to dissipate heat.

The present invention further provides a method of manufacturing the first and second support members of any of the preceding claims, the method comprises the step of:

cutting the resilient flexible beams and/or the first and second support members from single pieces of sheet material.

The single pieces of sheet material may consist of spring steel.

The method may further comprise the use of lead frame manufacturing techniques.

The invention provides a convenient low cost solution for creating a solar tracking system using scaleable manufacturing techniques. The idea is based on two parallel planes that translate, not rotate, relative to each other. Connected across the gap between the two planes, there is at least one element that uses the flexible beams to create rotational motion from the relative translation of the planes. Light receiving element (s) connected to the beams can track the motion as the two planes are displaced relative to one another. The solution to creating the rotational motion is therefore distinct from other solutions based on sliding contacts, bearings/rolling controls or jointed assemblies.

The present invention provides a structure that is designed to deform or bend to create large rotational deviations without the need for joints or sliding contacts.

The invention provides a structure that has reduced component count and assembly complexity and hence reduced cost. Reliability issues, such as the concern over dirt particles affecting bearings or sliding contacts, are resolved or reduced. Compatibility of the invention with low cost manufacturing techniques is possible, as are techniques that allow the device to be conveniently manufactured in array format.

In array format, each element of the array may contain an optical assembly to concentrate the suns rays onto an element such as a PV crystal. The optical arrangement within each element is usually to be a rigid structure, which does not deform significantly under the forces applied to it. Rather, the optical arrangement is held within the device of the invention.

In one embodiment of the present invention, it is possible to use the resilient flexible beams as electrical conductors to conduct away the electrical energy collected by a photovoltaic cell, thus saving the cost and complexity of providing separate electrical connections.

In another embodiment of the present invention, an additional passive component is added to the structure. This component can comprise wires that connect the two support members that limit the gap between the support members as they are laterally displaced relative to one another. For example, wires that are strong in tension could be connected between the upper and lower support members and attached so that they are vertical in the "default" state. When a relative translation is applied to one of the support members, these wires constrain the support members to move on an arc relative to each other. This is an advantage for the described design as it stops the resilient flexible beams from extending beyond their elastic limit when a large translation is applied. It also enables a larger angle of rotation (for the element) to be achieved.

The embodiment of the optical assembly could take many forms. These include a standard lens arrangement, a Fresnel lens, a parabolic reflector or a Compound Parabolic Concentrator (CPC).

An example of the present invention will now be described, in which.

Figure 1:
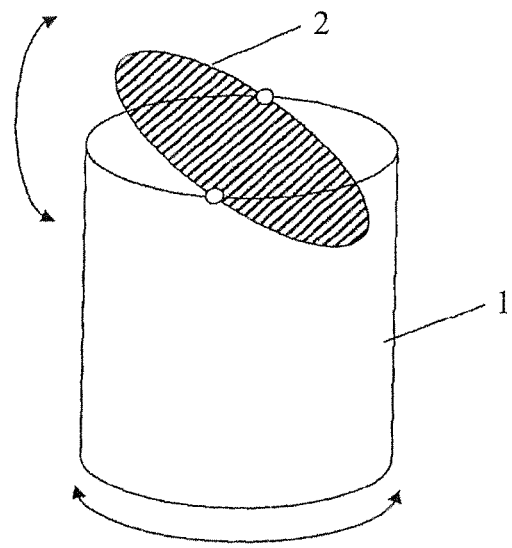
FIGS. 1 and 2 are schematic drawings showing prior art examples of light tracking elements.
Figure 2:
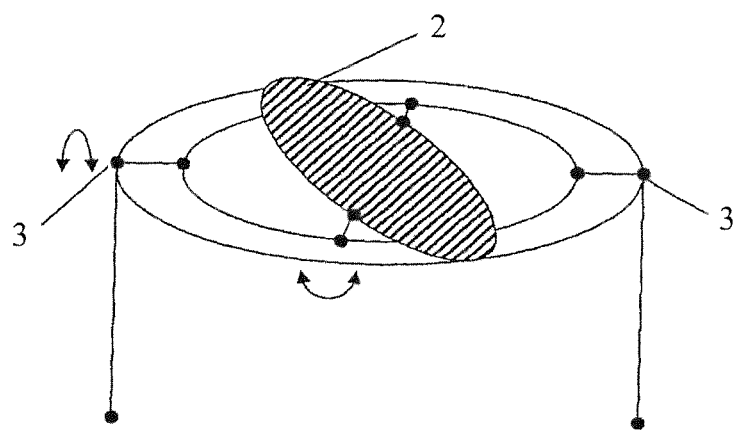

Referring to FIGS. 1 and 2 there is shown, as discussed above, examples of prior art light tracking arrangements that are used to support solar light collecting devices. In the arrangement of FIG. 1 a rotatable post 1 supports a tilting plate 2 which supports, in use, a light collecting element, so that tracking of the sun during its movement during the day can be performed to optimise light collection. In alternative arrangements following the same scheme, 1 rotatable post is used to support more than 1 tilting plate.

Figure 3:
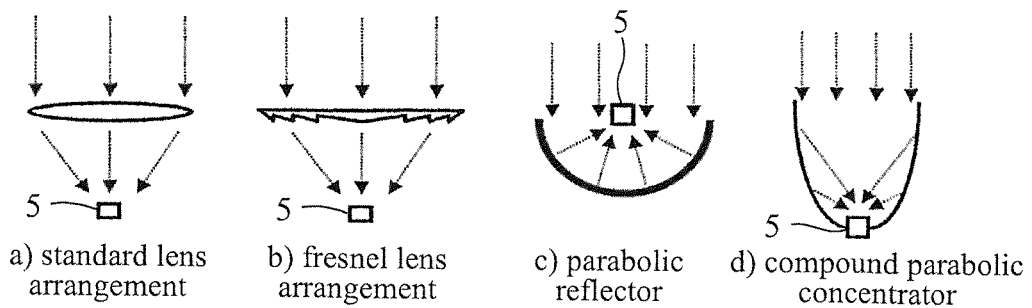
FIG. 3 is a schematic diagram showing example light collectors that may be used with the present invention.

FIG. 2 shows an alternative arrangement in which a similar tilting plate is provided but supported on a further pivotal support component 3. In alternative arrangements following the same scheme, (e.g. U.S. Pat. No. 4,968,355, Johnson), many plates are connected to a single pivotal support FIG. 3 shows optical elements that have been used in prior art devices and which can be employed in the present invention. In each of these a photovoltaic element 5 has light directed towards it by either a lens (options A or B) or a reflector (option C or D).

Figure 7:
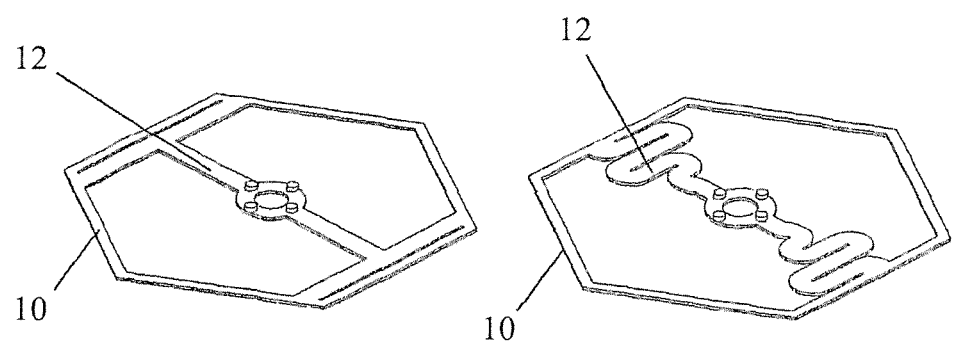
FIG. 7 shows other examples of resilient, flexible beams that may be used in the device of the present invention.

According to the present invention, this optical assembly is connected to the mechanical system by at least two points. The two points are connected to two independently movable planes that form the main structure via a section that forms a resilient flexible beam, or, in some preferred alternatives, space compressed resilient flexible beams. Space compressed resilient flexible beams are folded, or curve such that they are much longer than the direct path between their two anchor points, and hence their endpoints are able to deflect more than a simple straight beam before they exceed maximum strain for they behave elastically. FIG. 7 shows an example of a space compressed beam and a conventional, non-space compressed beam.

The beams are a part of the structure that is designed to deform elastically. A significant aspect of the design is that it enables it to convert translation motion into rotation to support the upper and lower planes of the light receiving element.

The target specification for the device is that it should be able to rotate in 2 directions from the centre point by at least +/−24 degrees in one direction (to account the seasonal variation of the sun's position in the sky), +/−>60 degrees in the other direction (to account for much of the daily variation of the sun's position).

Figure 4:
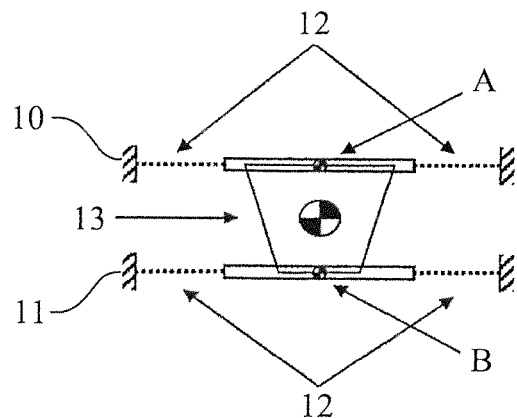
FIG. 4 is a schematic side view of a tracking device according to the present invention.

FIG. 4 show the device of the invention in schematic form. Upper and lower support members 10,11 are provided, each having resilient support beams 12 attached to a light receiving element 13.

Figure 5:
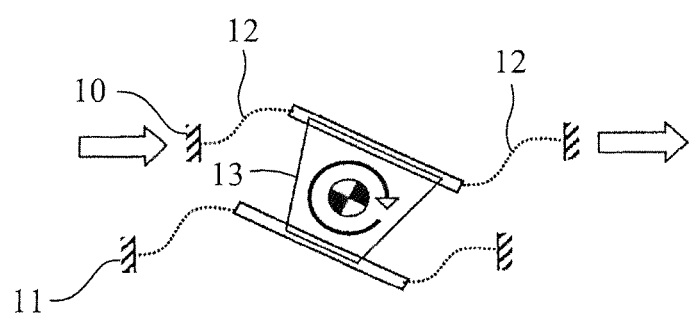
FIG. 5 is a schematic side view of the device of the present invention showing how rotational displacement is generated.

When the two members 10,11 are translated, but not rotated, relative to each other, the translation causes rotation of the element 13 that is connected between the two members 10,11 via the beams 12 around points A and B. FIGS. 4 and 5 illustrate this.

Due to the offset between these members 10,11, a linear translation of the upper plane with respect to the lower plane causes the optical element 13 to rotate as shown in FIG. 5.

Figure 6:
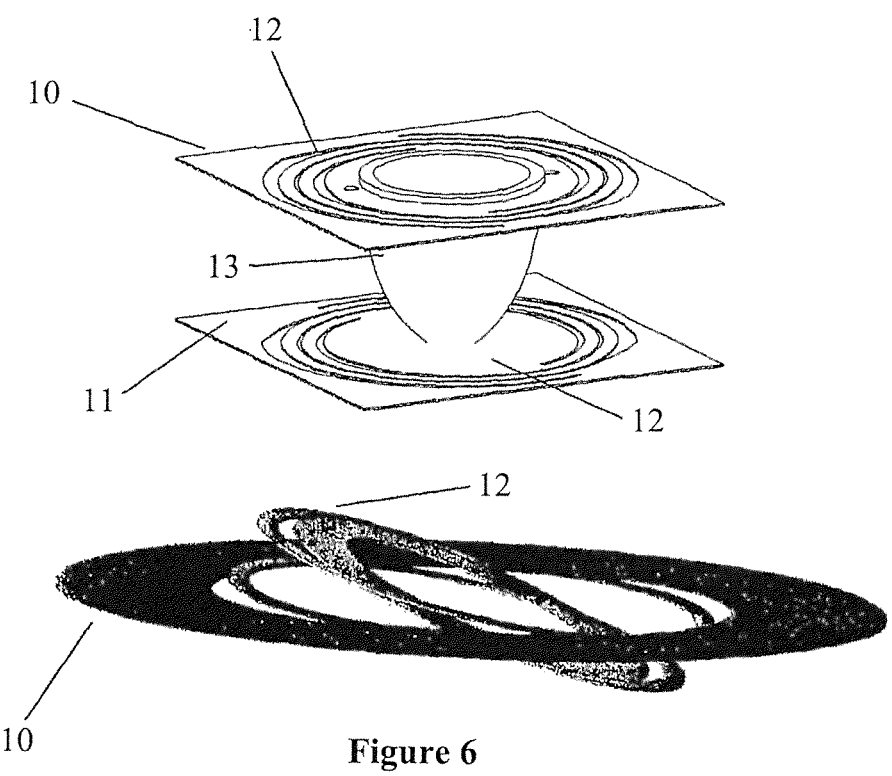
FIG. 6 is a side view of a device according to the present invention holding a single light collecting element and also showing how the resilient flexible beams deform to create rotation of the of the light collecting element when one support member is translated relative to the other.

The structure of the beams 12 is such that they allow points A and B (FIG. 4) to rotate in two axes. One such example for these beams 12 is two spiral arms as shown in FIG. 6. In this example, the spiral arms are created from a flat component, that lends itself to easy manufacture from sheet materials. Other arrangements based on 3D structures are alternative embodiments. Injection moulding may be a suitable manufacturing technique for such embodiments.

Such an arrangement allows the rotation of the element(s) 13 about the X and Y axis (shown in FIG. 6) to be controlled through the translation of the upper and lower support members 10,11. Hence the sun can be tracked through out the day and seasons.

Other types of beams are possible and two of these possibilities are shown in FIG. 7.

Figure 8:
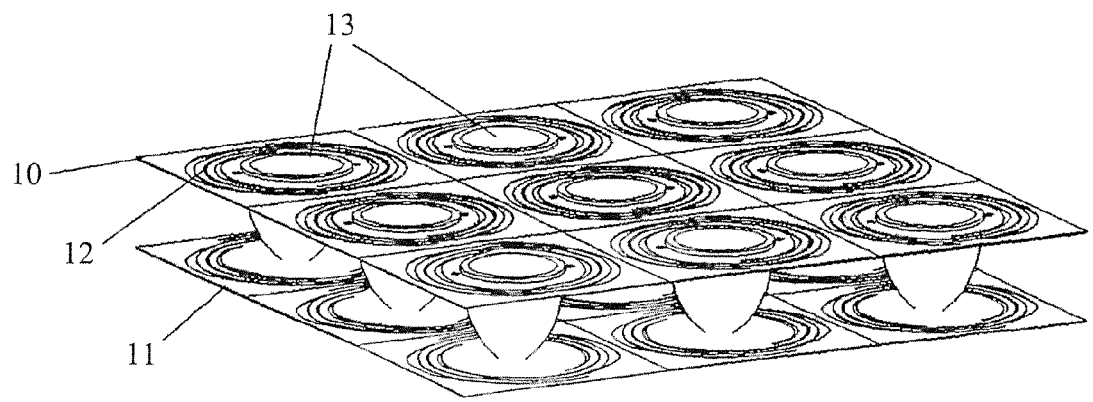
FIG. 8 shows an array of light collectors in a device according to the present invention.

One of the main advantages to this system is that many optical assemblies can be arranged in an array format and all controlled via the same upper and lower members. This allows a low profile, large area tracking system consisting of many small optical receivers to be built with far fewer separate parts as shown in FIG. 8.

So long as the tolerances in the manufacture of the beams for each element are small, the angle of rotation for each element will be identical, and thus they will all be pointing at the same position in the sky.

The control of each element can then be linked back, through the use of a single upper and lower member, to two or three actuators. One to control the x-axis offset between the upper and lower sheet, and the other to control the y-axis offset, with an optional third actuator to control the separation in the z-direction of the support members.

Figure 9:
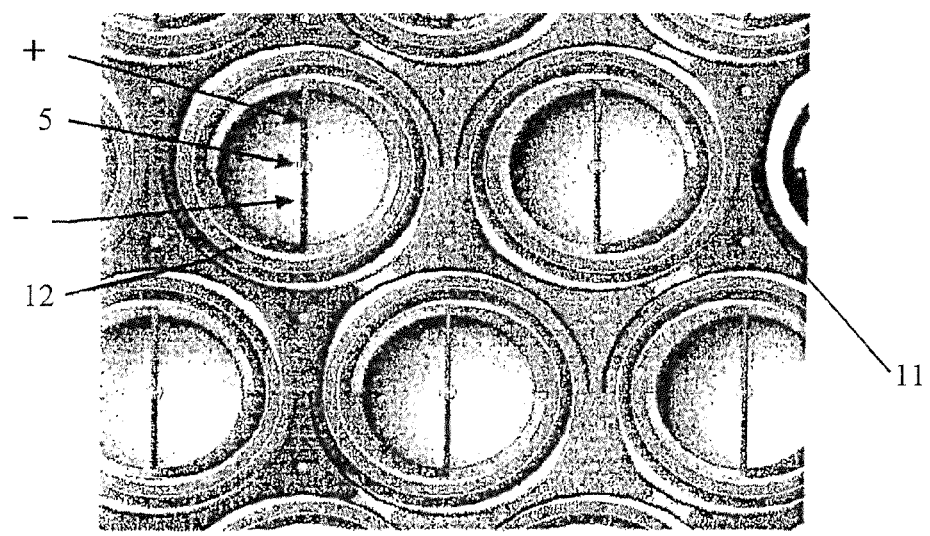
FIG. 9 is a planned view of a device according to the present invention showing possible electrical connection to the light collecting elements.

Placement of the PV 5 onto the lower sheet can be fully automated in manufacture. As shown in FIG. 9 the electrical connections (+,−) can then be tied to the two arms 12 of the lower member 11. This means that there is no need for any wiring to and from the elements; greatly reducing cost.

Figure 10:
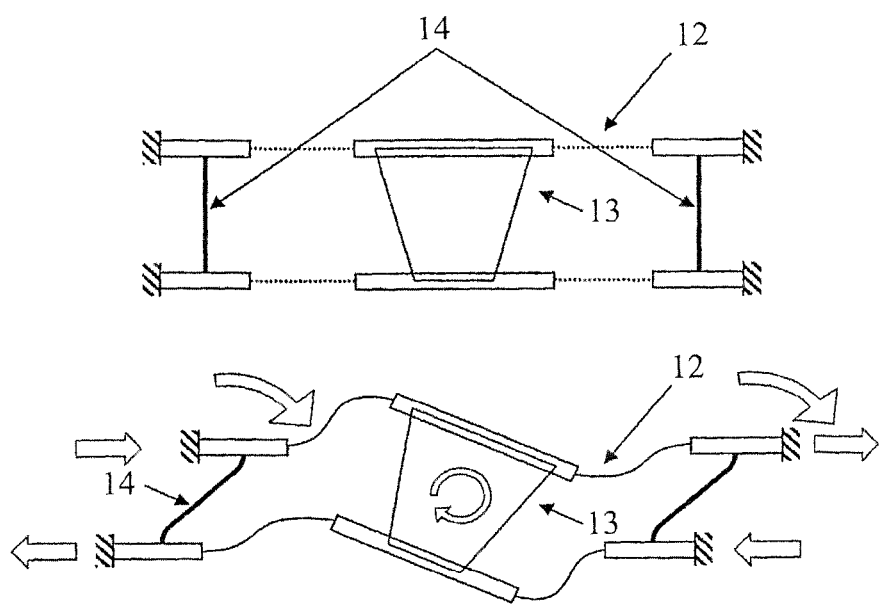
FIG. 10 shows a further embodiment of the invention where passive retaining elements are used to restrict the distance separating the support members.

It is also possible to improve the performance of the present invention using passive structural components such as those shown in FIG. 10. It is possible to improve the maximum displacement of the device by including additional passive elements into the system. For example, threads or strings of material that are strong only in tension can be connected between the rigid outer elements which limit the separation of these components.

For some designs, the inclusion of such a component increases the angle over which the optical receiving elements can be rotated. When a relative translation is applied to one of the support members, these wires constrain the support members to move on an arc relative to each other. Thus, these wires limit the separation of the support members, which changes the position of the end of the resilient flexible beams, and increase the rotational displacement of the elements.

It is also possible to design and manufacture one or more of the components in the system as a heat sink to dissipate unwanted heat generated in the PV cell.

The invention claimed is:

1. A light tracking device comprising:
   first and second support members; and
   at least one light receiving element supported on each support member by one or more resilient flexible beams which elastically deform upon relative translational displacement of the first and second support members,
   wherein the first and second support members and the resilient flexible beams are arranged such that relative translational displacement of the support members elastically deforms the resilient flexible beams and generates rotational displacement of the elements,
   wherein the one or more resilient flexible beams comprise spiral arms extending from the element to the first and second support members.

2. The light tracking device of claim 1, further comprising at least one photovoltaic cell for each light receiving element positioned at a point where the light is concentrated;
   wherein the at least one light receiving element is a solar concentrating element which concentrates the light.

3. The light tracking device of claim 2, wherein the photovoltaic cell is a multiple junction photovoltaic cell.

4. The light tracking device of claim 3, wherein the one or more resilient flexible beams are made of an electrically conductive material and wherein the resilient flexible beams are used to conduct electrical current away from the photovoltaic cell.

5. The light tracking device of claim 1, wherein the distance between the support members is controlled by at least one passive structural element which comprises a wire connecting the first and second support members.

6. The light tracking device of claim 1, wherein plural light receiving elements are supported on each support member, wherein the one or more resilient flexible beams comprise spiral arms extending from the element to the first and second support members.

7. The light tracking device of claim 6, wherein the one or more resilient flexible beams comprise spiral arms extending from the element to the first and second support members.

8. The light tracking device of claim 7, wherein one or each support member is provided with an actuator to generate the relative translational displacement.

9. A method of manufacturing first and second support members of a light tracking device, said light tracking device comprising:
   the first and second support members provided in two separate and substantially parallel planes; and
   at least one light receiving element supported on each support member across a gap between the two planes by one or more resilient flexible beams which elastically deform upon relative translational displacement of the first and second support members,
   wherein the first and second support members and the resilient flexible beams are arranged such that relative linear translational displacement of the support members elastically deforms the resilient flexible beams and generates rotational displacement of the elements,
   the method comprising the step of: cutting the resilient flexible beams and/or the first and second support members from single pieces of sheet material.

10. The method of claim 9, wherein each of the single pieces of sheet material consists of spring steel.

\* \* \* \* \*